United States Patent
Pavlik et al.

(10) Patent No.: US 7,203,863 B2
(45) Date of Patent: Apr. 10, 2007

(54) DISTRIBUTED TRANSACTION STATE MANAGEMENT THROUGH APPLICATION SERVER CLUSTERING

(75) Inventors: Greg Pavlik, Shamong, NJ (US); Peter H. Petersen, Trenton, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 522 days.

(21) Appl. No.: 10/434,096

(22) Filed: May 9, 2003

(65) Prior Publication Data

US 2004/0236989 A1 Nov. 25, 2004

(51) Int. Cl.
*G06F 11/00* (2006.01)
(52) U.S. Cl. ................................. 714/15; 714/13; 714/4
(58) Field of Classification Search ....................... None
See application file for complete search history.

(56) References Cited

U.S. PATENT DOCUMENTS

| | | | | |
|---|---|---|---|---|
| 5,696,895 | A * | 12/1997 | Hemphill et al. | 714/4 |
| 5,978,565 | A * | 11/1999 | Ohran et al. | 714/13 |
| 6,014,669 | A * | 1/2000 | Slaughter et al. | 707/10 |
| 6,163,855 | A * | 12/2000 | Shrivastava et al. | 714/4 |
| 6,421,787 | B1 * | 7/2002 | Slaughter et al. | 714/4 |
| 6,453,426 | B1 * | 9/2002 | Gamache et al. | 714/4 |
| 6,493,726 | B1 * | 12/2002 | Ganesh et al. | 707/201 |
| 6,757,836 | B1 * | 6/2004 | Kumar et al. | 714/4 |
| 6,832,298 | B2 * | 12/2004 | Fujii et al. | 711/147 |
| 6,859,834 | B1 * | 2/2005 | Arora et al. | 709/227 |
| 6,941,366 | B2 * | 9/2005 | Antes et al. | 709/224 |
| 6,944,788 | B2 * | 9/2005 | Dinker et al. | 714/4 |
| 2003/0036882 | A1 * | 2/2003 | Harper et al. | 702/186 |
| 2004/0139196 | A1 * | 7/2004 | Butler et al. | 709/225 |

* cited by examiner

*Primary Examiner*—Scott Baderman
*Assistant Examiner*—Joshua Lohn
(74) *Attorney, Agent, or Firm*—Bingham McCutchen LLP (57) ABSTRACT

A method, system, and computer program product stores transaction state information in application server process cluster information, eliminating transaction state logging and reducing the processing and communications expense that is necessary for transaction processing. A method of performing transaction execution comprises the steps of beginning execution of a transaction using a first process, storing a state of execution of the transaction in user state information included in cluster information accessible to a plurality of processes including the first process, switching a context from the first process to a second process that is one of the plurality of processes having access to the user state information included in the cluster information, and continuing execution of the transaction using the second process and the user state information included in the cluster information. The step of switching the context from the first process to the second process may be performed if the first process fails.

45 Claims, 8 Drawing Sheets

DISTRIBUTED TRANSACTION STATE MANAGEMENT THROUGH APPLICATION SERVER CLUSTERING

FIELD OF THE INVENTION

The present invention relates to storing transaction state information in application server process cluster information.

BACKGROUND OF THE INVENTION

Distributed server systems have become a standard technique for the implementation of databases, Web servers, application servers, etc. Accesses that are made to the data stored in such systems are known as transactions. Transactions that modify data stored in server systems present certain challenges in the operations of a distributed server system. In particular, modifications to data must be propagated to all necessary locations in the distributed server system in order to ensure that all portions of the system contain consistent data.

Distributed or Global Transactions use a completion protocol to guarantee data consistency among multiple systems. The "standard" protocol used to achieve consistency is the two phase commit protocol. The two phase commit protocol requires that transaction state be recovered when a coordinator fails and then restarts. This is conventionally accomplished by maintaining a transaction log either in a file system, a database, or another persistent store. Disk or network writes are expensive and various optimization techniques are used to minimize the number of log entries used for transaction processing. However, a need arises for a technique by which transaction state logging can be reduced, so as to reduce the processing and communications expense that is necessary for transaction processing.

SUMMARY OF THE INVENTION

The present invention stores transaction state information in application server process cluster information, eliminating transaction state logging and reducing the processing and communications expense that is necessary for transaction processing. The present invention takes advantage of the fact that application servers have merged with transaction monitors and distributed object technologies. The application server typically clusters state across multiple or at least one redundant process that can be used in the event of a failure in the primary process. This is a standard technique used across the industry. The present invention takes advantage of this fact and in lieu of logging transaction state to a file system or database, includes the current state of the user's transaction within the user state managed by the cluster. In this way, no transaction logging occurs and coordinator failures are handled by switching context through the existing cluster mechanism to an instance that can complete the transaction.

In one embodiment of the present invention, a method of performing transaction execution comprises the steps of beginning execution of a transaction using a first process, storing a state of execution of the transaction in user state information included in cluster information accessible to a plurality of processes including the first process, switching a context from the first process to a second process that is one of the plurality of processes having access to the user state information included in the cluster information, and continuing execution of the transaction using the second process and the user state information included in the cluster information. The step of switching the context from the first process to the second process may be performed if the first process fails.

The first process may be a server process, the second process may be a server process, and the plurality of processes may be server processes. The first process may be an application server process, the second process may be an application server process, and the plurality of processes may be application server processes.

The transaction may be executed using a two phase transaction protocol. The first process may be a coordinator of the two phase transaction protocol, the second process may be a coordinator of the two phase transaction protocol, and the plurality of processes may be coordinators of the two phase transaction protocol. The first process may be a participant in the two phase transaction protocol, the second process may be a participant in the two phase transaction protocol, and the plurality of processes may be participants in the two phase transaction protocol.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

The present invention provides a technique by which transaction logging can be reduced, so as to reduce the processing and communications expense that is necessary for transaction processing.

The present invention takes advantage of the fact that application servers have merged with transaction monitors and distributed object technologies. The application server typically clusters session state across multiple or at least one redundant process that can be used in the event of a failure in the primary process. This is a standard technique used across the industry. The present invention takes advantage of this fact and in lieu of logging transaction state to a file system or database, includes the current state of the user's transaction within the user state managed by the cluster. In this way, no transaction logging occurs and coordinator failures are handled by switching context through the existing cluster mechanism to an instance that can complete the transaction.

Figure 1:
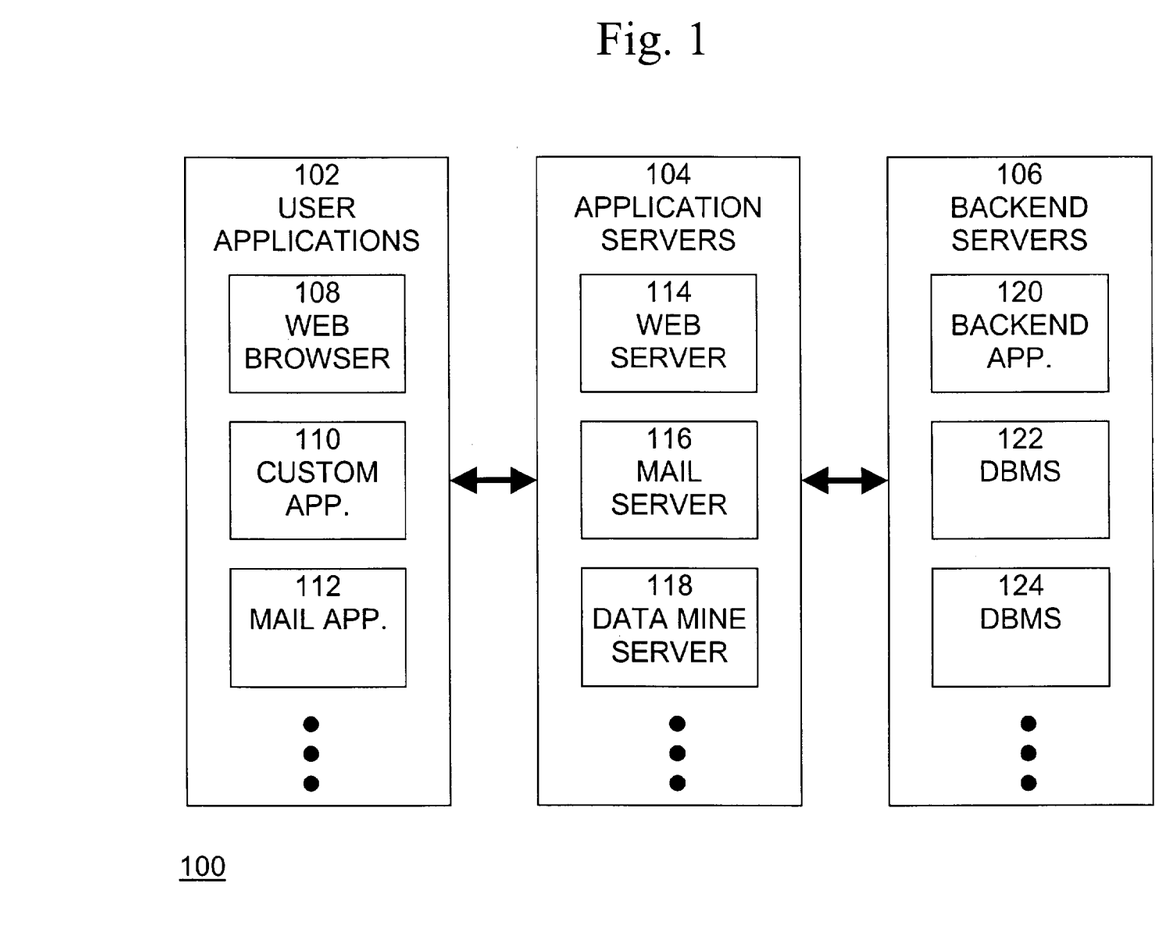
FIG. 1 is an exemplary block diagram of a system architecture in which the present invention may be implemented.

An exemplary system architecture 100, in which the present invention may be implemented, is shown in FIG. 1. System 100 includes user applications 102, application servers 104, and backend servers 106. User applications 102 include a plurality of applications that are operated by or interface with a user, such as web browser 108, custom application 110, and mail application 112. Application servers 104 include a plurality of servers that handle application operations between user applications 102 and backend servers 106, such as web server 114, mail server 116, and data mining server 118. Application servers are typically used for complex transaction-based applications. To support high-end needs, an application server should have built-in redundancy, monitors for high-availability, high-performance distributed application services and support for complex database access.

Examples of types of servers that may be included in application servers 104 include:

Audio/Video Servers: Audio/Video servers bring multimedia capabilities to Web sites by enabling them to broadcast streaming multimedia content.

Chat Servers: Chat servers enable a large number of users to exchange information in an environment similar to Internet newsgroups that offer real-time discussion capabilities.

Fax Servers: A fax server is an ideal solution for organizations looking to reduce incoming and outgoing telephone resources but that need to fax actual documents.

FTP Servers: One of the oldest of the Internet services, File Transfer Protocol makes it possible to move one or more files securely between computers while providing file security and organization as well as transfer control.

Groupware Servers: A groupware server is software designed to enable users to collaborate, regardless of location, via the Internet or a corporate intranet and to work together in a virtual atmosphere.

IRC Servers: An option for those seeking real-time discussion capabilities, Internet Relay Chat consists of various separate networks (or "nets") of servers that allow users to connect to each other via an IRC network.

List Servers: List servers offer a way to better manage mailing lists, whether they be interactive discussions open to the public or one-way lists that deliver announcements, newsletters, or advertising.

Mail Servers: Almost as ubiquitous and crucial as Web servers, mail servers move and store mail over corporate networks (via LANs and WANs) and across the Internet.

News Servers: News servers act as a distribution and delivery source for the thousands of public news groups currently accessible over the USENET news network.

Proxy Servers: Proxy servers sit between a client program (typically a Web browser) and an external server (typically another server on the Web) to filter requests, improve performance, and share connections.

Telnet Servers: A Telnet server enables users to log on to a host computer and perform tasks as if they're working on the remote computer itself.

Web Servers: At its core, a Web server serves static content to a Web browser by loading a file from a disk and serving it across the network to a user's Web browser. This entire exchange is mediated by the browser and server talking to each other using HTTP.

Backend servers 106 include a plurality of servers, such as backend business application 120 and database management systems 122 and 124. Database management systems (DBMSs) are software that enables storing, modifying, and extracting information from a database. There are many different types of DBMSs, ranging from small systems that run on personal computers to huge systems that run on mainframes. Examples of database applications include:

computerized library systems
automated teller machines
flight reservation systems
computerized parts inventory systems From a technical standpoint, DBMSs can differ widely. The terms relational, network, flat, and hierarchical all refer to the way a DBMS organizes information internally. The internal organization can affect how quickly and flexibly you can extract information.

The precise architecture of any particular application server depends upon a variety of factors, such as its overall function, expected load, required availability, and other usage, business, financial, and engineering factors. Application servers typically have web servers for static or dynamic content; distributed object request brokers (ORBs), transaction managers, data caches and resource adapters that allow the application server to communicate with transactional resource managers (databases, message queues, etc). While these components may be integrated into an application server, they are generally not related to transaction processing. For example, the web server may in fact be used for Simple Object Access Protocol (SOAP) processing and act as a transport for distributed transaction context propagation; the ORB infrastructure may do the same.

Distributed or Global Transactions use a completion protocol to guarantee data consistency among multiple systems. The "standard" protocol used to achieve consistency is the two phase commit protocol. The two phase commit protocol requires that transaction state be recovered when a coordinator fails and then restarts. This is conventionally accomplished by maintaining a transaction log either in a file system, a database, or another persistent store. Disk or network writes are expensive and various optimization techniques are used to minimize the number of log entries used for transaction processing.

Figure 2:
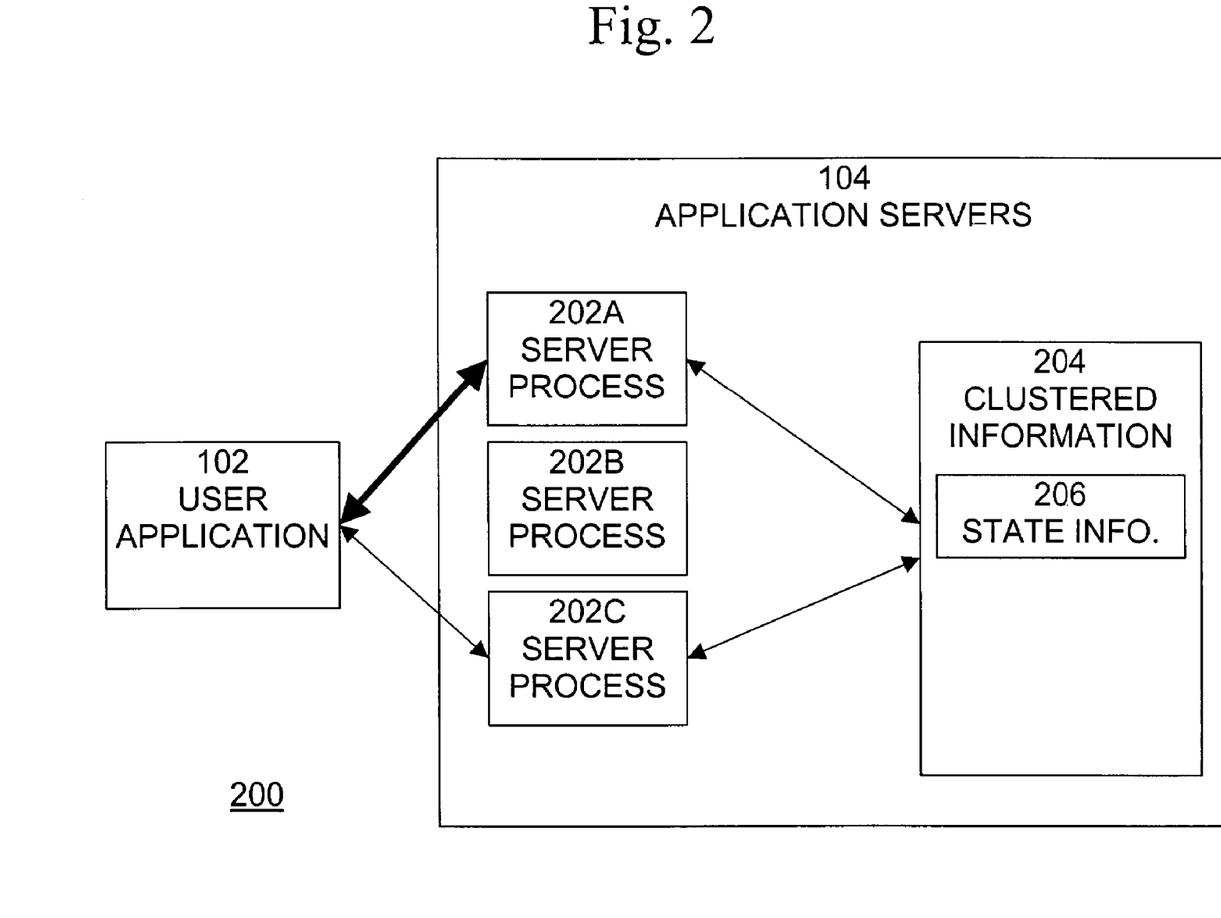
FIG. 2 is an exemplary block diagram of clustering in application servers, in which the present invention may be implemented.

An exemplary block diagram of clustering in application servers is shown in FIG. 2. A particular user application 102 interacts with application servers 104. Application servers include a plurality of server processes 202A–C. Modern application servers provide the capability to cluster server processes. Clustering involves the sharing of information among server processes so that more than one server process can respond to a particular request.

In some implementations, user application 102 and process 202 interact using a stateless protocol. Every request from user application 102 includes all the information needed for application servers 104 to perform a certain task. In such an implementation, clustering is easily provided, requiring only that a request from a user application can be handled by more than one server process that are in the same cluster.

However, many implementations require user applications to interact with application servers using client sessions that include data stored on the server about each specific client. In order to cluster such session-based application server processes, it is no longer enough that the document hierarchy is shared among server processes. Instead, storing the state in a server process will mean that requests sent to different processes will produce in different results. Clustering in this environment requires replicating all state information in a server process to at least one other server process, or preferably, maintaining user state information in a way that it can be managed by all server processes in a given cluster. Typically, the user application may transparently interact with any server process in the cluster, which have access to the appropriate state information. For example, user application 102 interacts with server process 202A, which is clustered with server process 202C. Both server process 202A and 202C access and manage clustered information 204, which includes state information, such as state information 206. Interaction between user application 102 and application servers 104 is may be directed to any clustered server process that has access to clustered information 304, such as server processes 202A and 202C. At any given moment, the user application interacts with a particular server process. If the original server process fails, the user process must be transparently be redirected to another server process in the cluster that has access to the user state information. For example, user application 102 interacts with process 202A, which has access to state information, such as state information 206. If server process 202A fails, then interaction with user application 102 is redirected to server process 202C, which also has access to state information 206.

In transaction-based interactions between user application 102 and application servers 104, information relating to the state of the transaction must be maintained in order for the transaction to properly complete, either by committing or aborting. A well-known protocol for performing transactions is the two phase transaction protocol, which is described below. Conventionally, a number of log records are stored during performance of each transaction. These log records indicate the state of the transaction and allow recovery from failures that occur at points in the transaction. However, the present invention replaces logging of transaction state to a file system or database with including the transaction state within the user state managed by the cluster. In this way, no transaction logging occurs and coordinator failures are handled by switching context through the existing cluster mechanism to an instance that can complete the transaction.

Figure 3A:
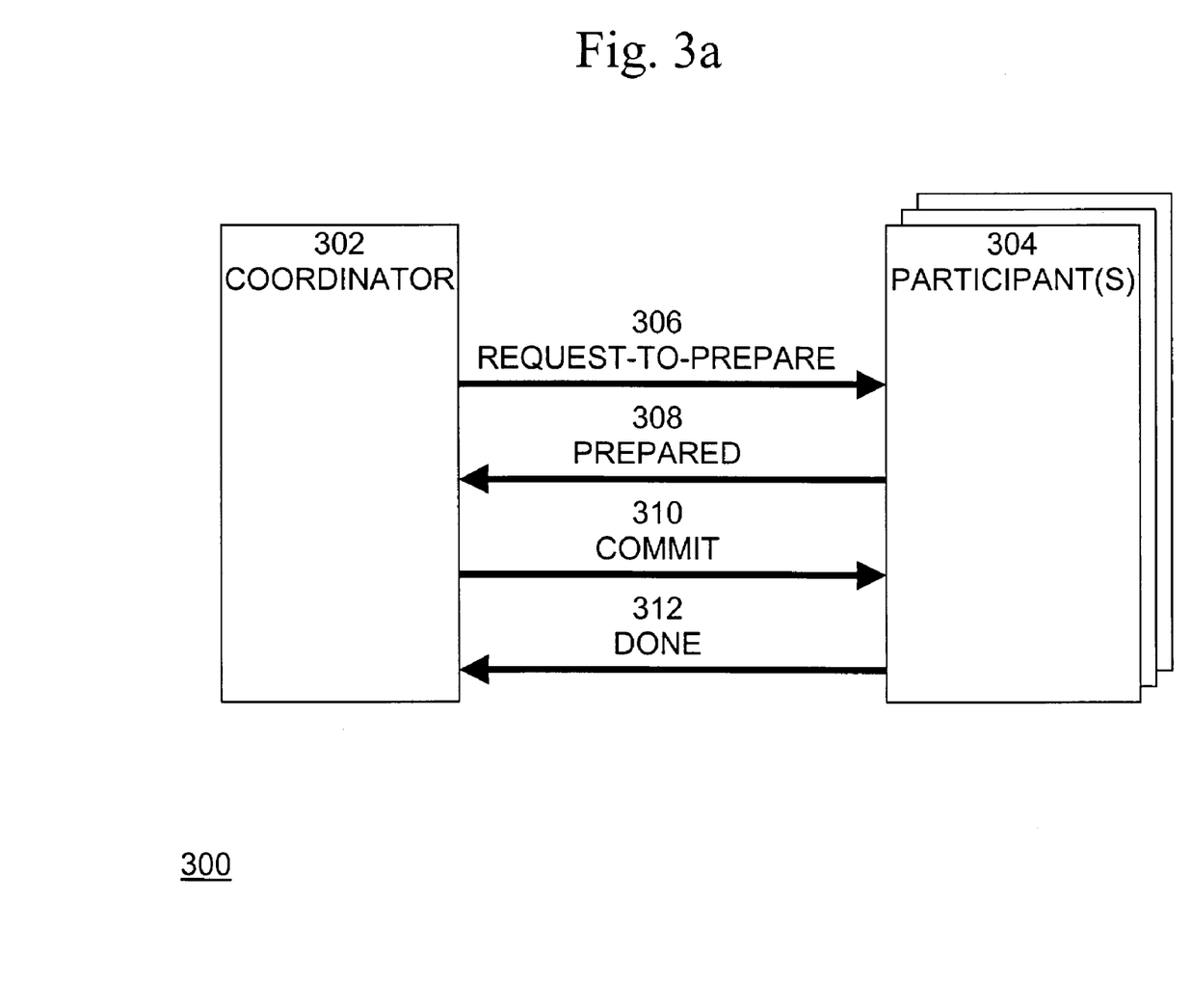
FIG. 3a is an exemplary data flow diagram of a two phase commit protocol.
Figure 3B:
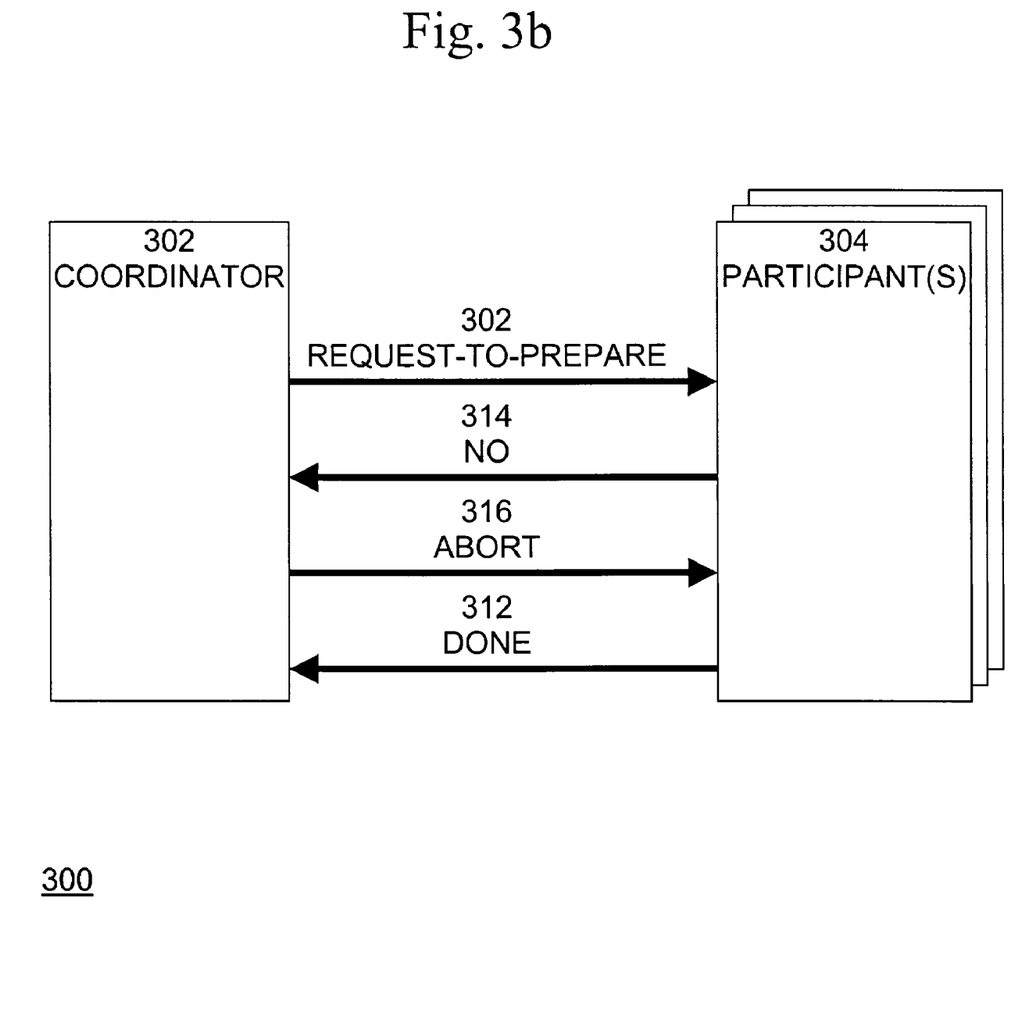
FIG. 3b is an exemplary data flow diagram of a two phase commit protocol.
Figure 4:
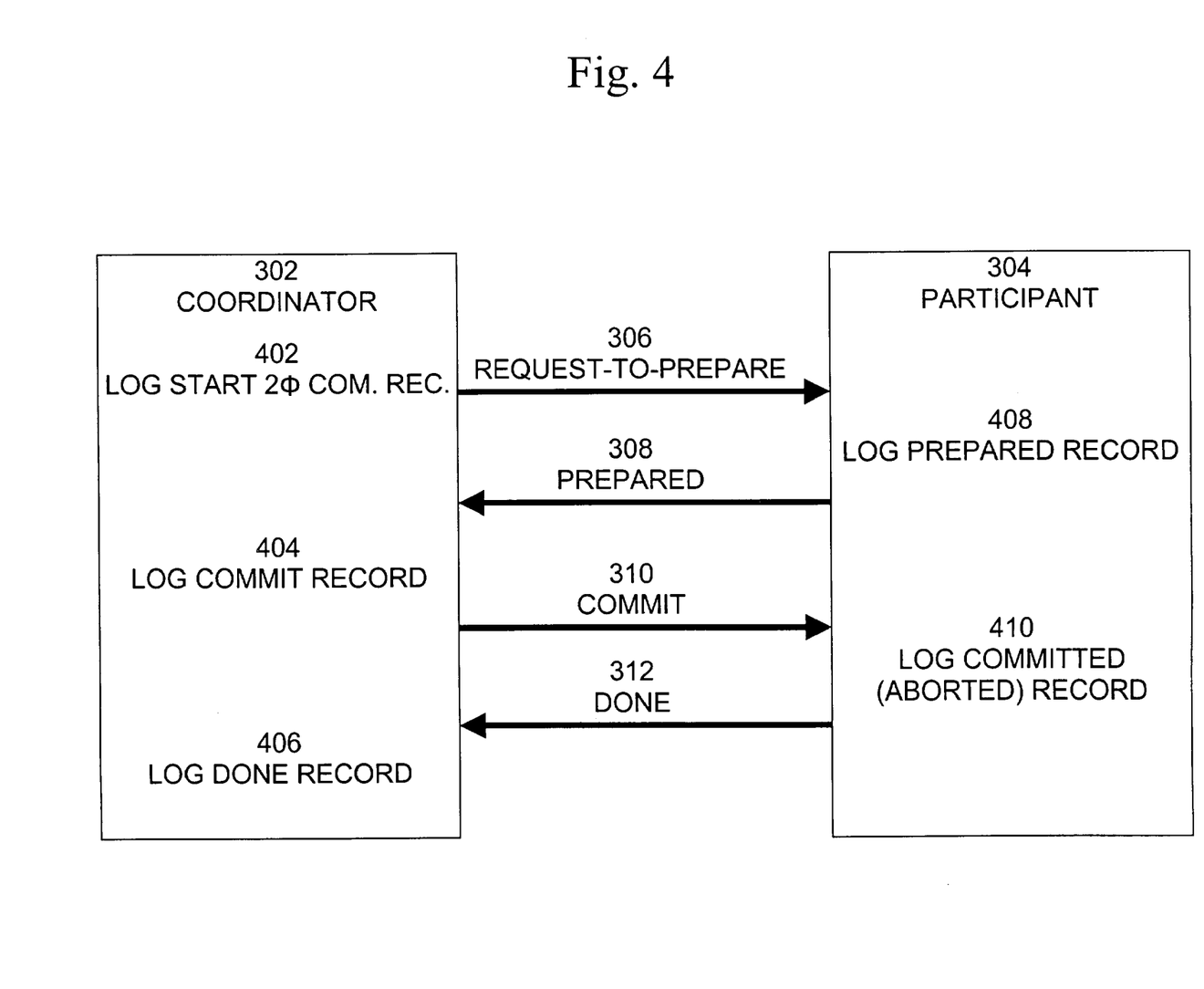
FIG. 4 is an exemplary data flow diagram of log records written in a conventional system performing the two phase transaction protocol.

An exemplary data flow diagram of a two phase commit protocol 300, is shown in FIGS. 3a and 3b. FIG. 3a illustrates operation of the protocol in the situation in which the transaction commits. FIG. 3b illustrates operation of the protocol in the situation in which the transaction aborts. FIGS. 3a and 3b are best viewed in conjunction. In protocol 300, messages are communicated between a coordinator 302 and one or more participants 304. Coordinator 302 is the component that runs the two-phase commit protocol on behalf of one transaction, that is, the coordinator is the component that receives the commit or abort request and drives the execution of the protocol. Participants 304 are resource managers that do work on behalf of the transaction, for example, by reading and updating resources. The goal is to ensure that the coordinator and all participants commit the transaction, as shown in FIG. 3, or the coordinator and all participants abort the transaction, as shown in FIG. 4.

A resource manager is a term used to describe the role of system components that manage the operation of resources, such as DBMSs. A resource is a term used to describe an item that is managed by a resource manager, such as a database managed by a DBMS. The terms "resource manage" and "resource," are used to broaden the description of the system components that are used in the two-phase commit protocol because, when a transaction commits, all of the shared resources it accesses need to get involved in the commitment activity, not just databases. Nondatabase resources include recoverable scratch pad areas, queues, and other communications systems.

The two-phase commit protocol makes the following assumptions about each transaction T:

1. Transaction T accesses resources from time to time. If it experiences a serious error at any time, such as a deadlock or illegal operation, it issues an abort operation. If it terminates normally without any errors, it issues a commit. In response to the commit, the system runs the two-phase commit protocol.
2. Each resource manager can commit or abort its part of T, that is, permanently install or undo T's operations that involve this resource manager. Thus, each resource manager typically has a transactional recovery system.
3. One and only one program issues the commit operation on T. That is, one program decides when to start committing T by running the two-phase commit protocol, and no other program will later start running the protocol on T independently. In some cases, a second attempt to run two-phase commit while the first attempt is still running will cause the protocol to break, that is, will cause it to commit at one resource manager and abort at another. The protocol can be programmed to cope with concurrent attempts to run two-phase commit, but we assume it does not happen.
4. Transaction T has terminated executing at all resource managers before issuing the commit operation. In general, this can be hard to arrange. If the transaction does all of its communications using RPC, then it can ensure T has finished processing at all resource managers by waiting for all of those calls to return, provided that each resource manager finishes all of the work it was asked to do before returning from the call. If T uses other communications paradigms, such as peer-to-peer, then it has to ensure by some other means that T terminated. For example, the well-known LU6.2 protocol, carefully dovetails two-phase commit with the transaction termination protocol. This assumption allows us to avoid dealing with the complexity of transaction termination here.
5. Every system and resource manager fails by stopping. That is, the protocol does not make mistakes when its system or a resource manager malfunctions. It either does exactly what the protocol says it should do, or it stops running. It is possible for a failure to cause the protocol to do something that is inconsistent with the specification, such as sending bogus messages.

Being Prepared

A participant P is said to be prepared if all of transaction T's after-images at P are in stable storage. It is essential that T does not commit at any participant until all participants are prepared. The reason is the force-at-commit rule, which says not to commit a transaction until the after-images of all of its updates are in stable storage. To see what goes wrong if you break the rule, suppose one participant, P1, commits T before another participant, P2, is pre-pared. If P2 subsequently fails, before it is prepared and after P1 commits, then T will not be atomic. T has already committed at P1, and it cannot commit at P2 because P2, may have lost some of T's updates when it failed. On the other hand, if P2 is prepared before P, commits, then it is still possible for T to bc atomic after P2 fails. When P2 recovers, it still has T's updates in stable storage (because it was prepared before it failed). After it recovers and finds out that T committed, it too can finish committing T.

Ensuring that all participants are prepared before any of them commits is the essence of two-phase commit. Phase 1 is when all participants become prepared. Phase 3 is when they commit. No participant enters phase 3 until all participants have completed phase 1, that is, until all participants are prepared.

The Protocol

The protocol proceeds as follows
1. Begin phase 1: To commit the transaction, the coordinator 302 starts by sending a REQUEST-TO-PREPARE message 306 to each participant 304.
2. The coordinator 302 waits for all participants 304 to "vote" on the request.
3. In response to receiving a REQUEST-TO-PREPARE message 306, each participant 304 votes by sending a message back to the coordinator, as follows:
   a. It votes PREPARED by sending a PREPARED message 308 if it is prepared to commit.
   b. It may vote NO by sending a NO message 314 for any reason, usually because it cannot prepare the transaction due to a local failure.
   c. It may delay voting indefinitely, usually because its system is overburdened with other work.
4. Begin phase 3: If the coordinator 302 receives PREPARED messages 308 from all participants 304, it decides to commit. The transaction is now officially committed. Otherwise, it either received at least one NO message 314 or gave up waiting for some participant, so it decides to abort.
5. The coordinator 302 sends its decision to all participants 304 using COMMIT messages 310 or ABORT messages 316.
6. Participants 304 acknowledge receipt of the COMMIT messages 310 or ABORT messages 316 by replying with DONE messages 312.
7. After receiving DONE messages 312 from all participants 304, the coordinator 302 can forget the transaction, mean that it can deallocate any memory it was using to keep track of information about the transaction.

In conventional systems performing the two phase transaction protocol, coordinator 302 and participant(s) 304 need to write a number of log records, as shown in FIG. 4. Before coordinator 302 sends a REQUEST-TO-PREPARE message 306, coordinator 302 logs a start-two-phase-commit record 402, which includes a list of the participants 304. This writing is eager in that coordinator 302 must wait until this record is in the stable log before sending a REQUEST-TO-PREPARE message 306 to any participant 304. Otherwise, if coordinator 302 failed after sending the REQUEST-TO-PREPARE message 306 and before the log record 402 was stable, coordinator 302 would not know which participants to notify about the decision.

Before sending a commit decision, coordinator 302 logs a commit record 404. Indeed, writing the commit record 404 to the log is what actually commits the transaction. This too is eager. Otherwise, if the coordinator failed after sending the COMMIT message 310 and before flushing the commit record 404 to the log, and coordinator 302 subsequently recovered, coordinator 302 would abort the transaction during its recovery procedure, producing an inconsistent outcome (since the participant that received the COMMIT message committed). After coordinator 302 receives the DONE messages, it writes a log done record 406, which records the fact that the transaction is finished. This is lazy, in that coordinator 302 need not wait until log done record 406 is stable before proceeding to further processing.

When a participant 304 receives a REQUEST-TO-PREPARE message 306 from the coordinator 302, participant 304 writes a prepared record 408 to the log. This is eager, that is, participant 304 waits until the prepared record 408 is in the stable log before sending PREPARED message 308 to the coordinator 302. Otherwise, if participant 304 failed after sending PREPARED message 308 and before flushing the prepared record 408 to the log, and participant 304 subsequently recovered, participant 304 would abort the transaction during its recovery procedure (since there is no prepared or commit record in the log). But since participant 304 sent PREPARED message 308, it gave permission to the coordinator 302 to commit the transaction, which would produce an inconsistent outcome. Participant 304 writes a log record, a commit or abort record 410, after participant 304 receives the decision message from the coordinator 302. The log committed or aborted record 410 is eager, since once participant 304 sends DONE, participant 304 gives permission to the coordinator 302 to forget the transaction. If participant 304 fails after sending DONE message 312 and before the decision message is stable, then at recovery time participant 304 might not be able to find out what the decision was. Moreover participant 304 holds locks for the transaction until after it commits or aborts, so the sooner it logs the decision, the sooner participant 304 can release locks.

Figure 5:
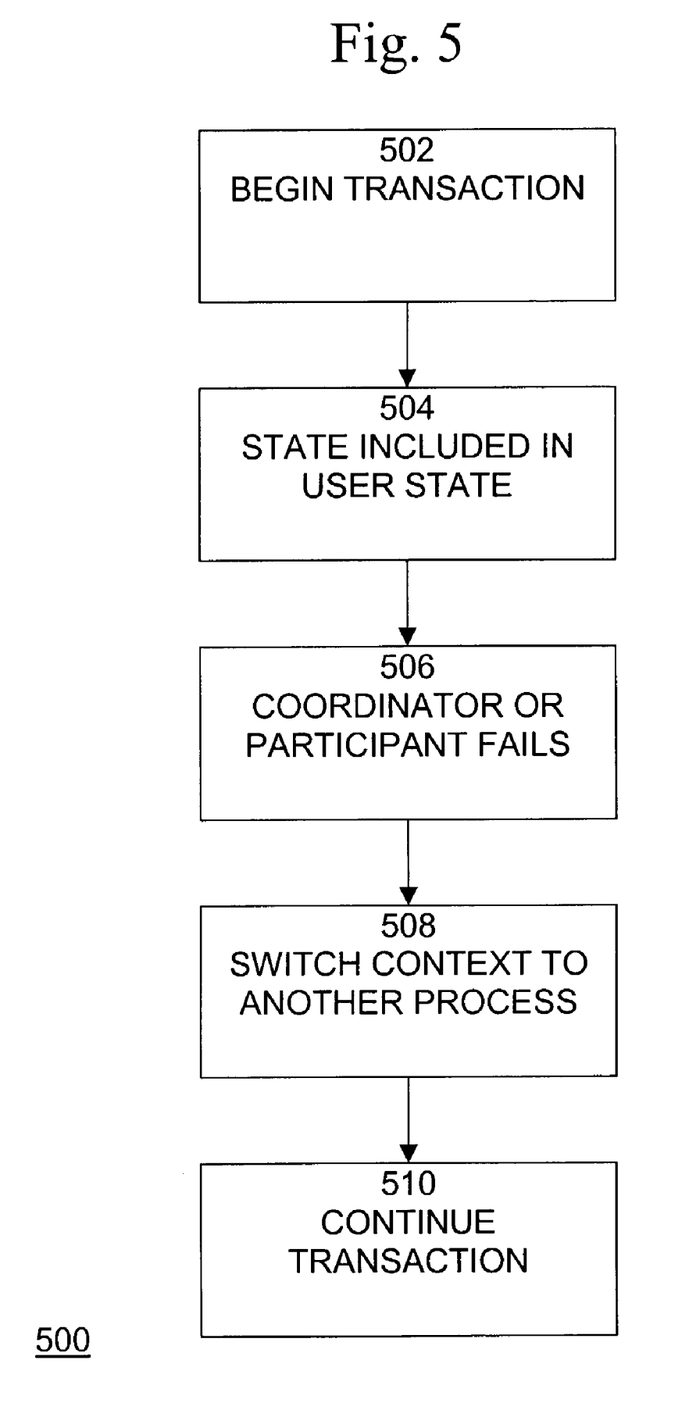
FIG. 5 is an exemplary flow diagram of a process of operation of the present invention.

In the present invention, the log records shown in FIG. 4 are not needed. Instead, the state of the transaction is stored in the user state included in the cluster information. An example of a process 500 of operation of the present invention is shown in FIG. 5. It is best viewed in conjunction with FIG. 6, which is a data flow diagram of operation of the present invention. Process 500 begins with step 502, in which a transaction, preferably using the two phase transaction protocol, begins execution by a server process. In step 504, the execution state of the transaction is stored in the user state included in the cluster information accessible by the server process. For example, for a server process acting as a coordinator 302, transaction state information is stored in user state information 602 included in the cluster information 604 accessible by the coordinator 302. The transaction state information, for example, where the two phase transaction protocol is used, includes start state 606, commit or abort state 608, and done state 610. For a server process acting as a participant 304, transaction state information is stored in user state information 612 included in the cluster information 614 accessible by the participant 304. The transaction state information, for example, where the two phase transaction protocol is used, includes prepared state 616 and committed or aborted state 618. Depending on the recovery protocol, some additional information about the branches may also need to be maintained in user state information 612.

Figure 6:
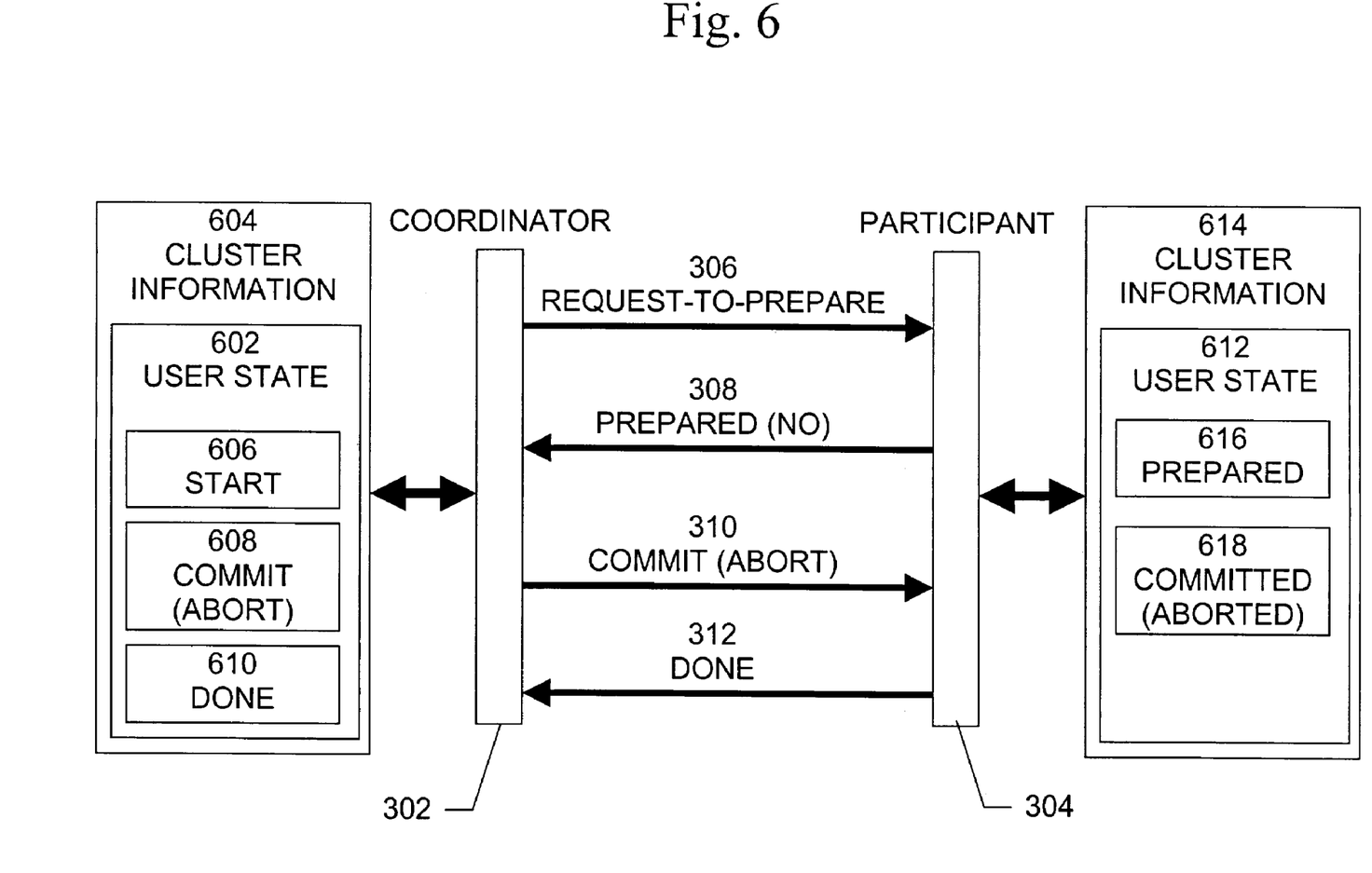
FIG. 6 is an exemplary data flow diagram of operation of the present invention.

In step 506, the coordinator or participant fails during a transaction. In step 508, the context is switched to another process that has access to the cluster information of the failed coordinator or participant. For example, if coordinator 302 fails, the context is switched to another process that has access to cluster information 604 and which can act as the coordinator. Likewise if participant 304 fails, the context is switched to another process that has access to cluster information 614 and which can act as the participant. In step 510, the transaction continues with the process to which the context has been switched acting as the coordinator or participant. Since the process to which the context has been switched has access to the cluster information, the transaction can continue from the last state stored in the user state information before the coordinator or participant failed.

Figure 7:
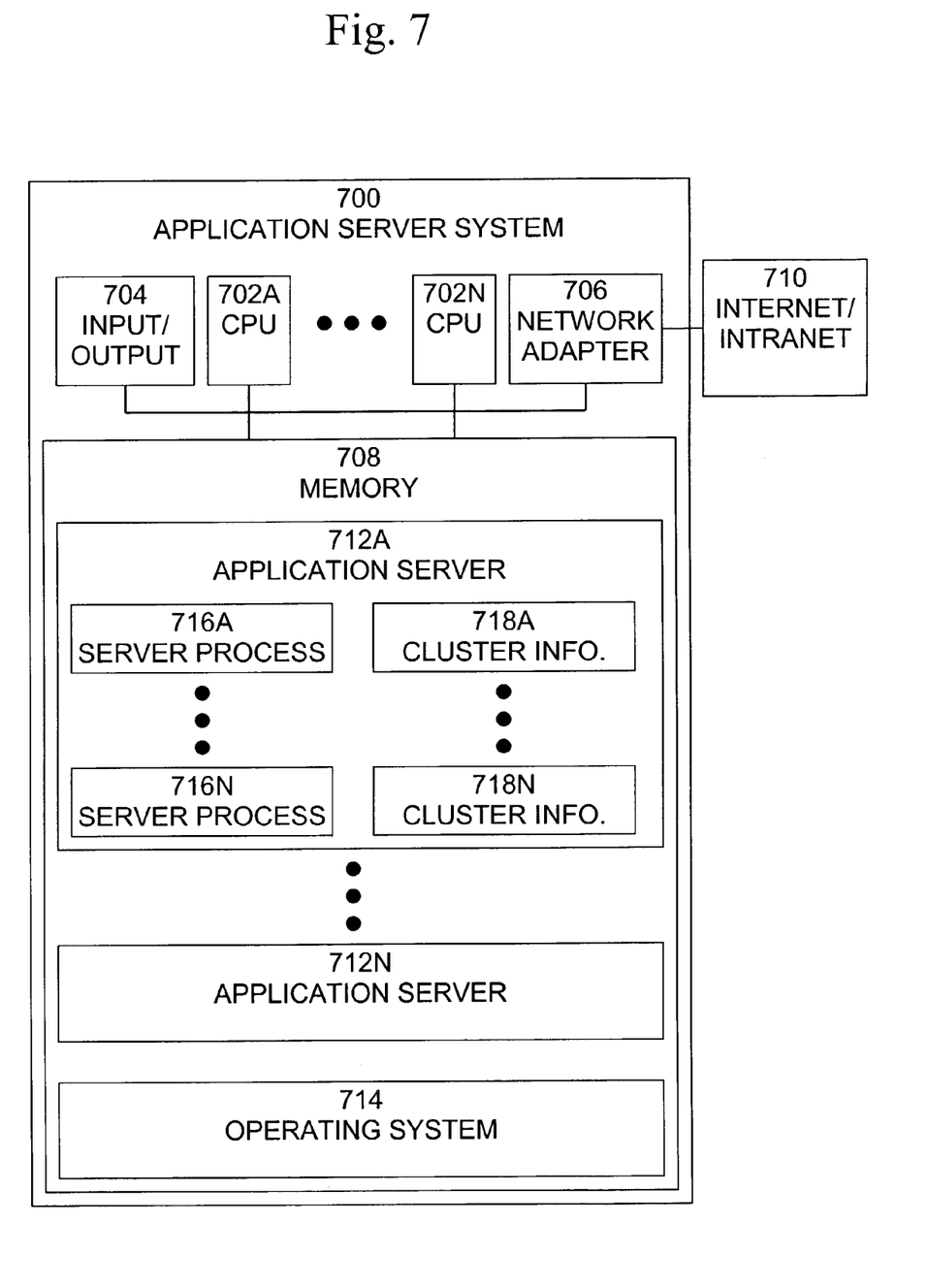
FIG. 7 is an exemplary block diagram of an application server system, in which one or more application servers may be implemented.

An exemplary block diagram of an application server system 700, in which one or more application servers may be implemented, is shown in FIG. 7. System 700 is typically a programmed general-purpose computer system, such as a personal computer, workstation, server system, and minicomputer or mainframe computer. System 700 includes one or more processors (CPUs) 702A–702N, input/output circuitry 704, network adapter 706, and memory 708. CPUs 702A–702N execute program instructions in order to carry out the functions of the present invention. Typically, CPUs 702A–702N are one or more microprocessors, such as an INTEL PENTIUM® processor. FIG. 7 illustrates an embodiment in which System 700 is implemented as a single multi-processor computer system, in which multiple processors 702A–702N share system resources, such as memory 708, input/output circuitry 704, and network adapter 706. However, the present invention also contemplates embodiments in which System 700 is implemented as a plurality of networked computer systems, which may be single-processor computer systems, multi-processor computer systems, or a mix thereof.

Input/output circuitry 704 provides the capability to input data to, or output data from, database/System 700. For example, input/output circuitry may include input devices, such as keyboards, mice, touchpads, trackballs, scanners, etc., output devices, such as video adapters, monitors, printers, etc., and input/output devices, such as, modems, etc. Network adapter 706 interfaces database/System 700 with Internet/intranet 710. Internet/intranet 710 may include one or more standard local area network (LAN) or wide area network (WAN), such as Ethernet, Token Ring, the Internet, or a private or proprietary LAN/WAN.

Memory 708 stores program instructions that are executed by, and data that are used and processed by, CPU 702 to perform the functions of system 700. Memory 708 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

In the example shown in FIG. 7, memory 708 includes a plurality of application servers 712A–N and operating system 714. Application servers 712A–N are software that handle application operations between user applications and backend servers. Application servers are typically used for complex transaction-based applications. Operating system 714 provides overall system functionality.

Each application server, such as application server 712A, includes a plurality of server processes 716A–N and cluster information 718A–N. Modern application servers provide the capability to cluster server processes. Clustering involves the sharing of information, such as cluster information 718A–718N, among server processes, such as server processes 716A–N, so that more than one server process can respond to a particular request.

As shown in FIG. 7, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multitasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of performing transaction execution comprising the steps of:
   beginning execution of a transaction using a first process;
   not maintaining a log of the transaction;
   storing a state of execution of the transaction only in user state information included in cluster information accessible to a plurality of processes including the first process;
   switching a context from the first process to a second process that is one of the plurality of processes having access to the user state information included in the cluster information; and
   continuing execution of the transaction using the second process and the user state information included in the cluster information.

2. The method of claim 1, wherein the step of switching the context from the first process to the second process is performed if the first process fails.

3. The method of claim 2, wherein the first process is a server process.

4. The method of claim 3, wherein the second process is a server process.

5. The method of claim 4, wherein the plurality of processes are server processes.

6. The method of claim 2, wherein the first process is an application server process.

7. The method of claim 6, wherein the second process is an application server process.

8. The method of claim 7, wherein the plurality of processes are application server processes.

9. The method of claim 2, wherein the transaction is executed using a two phase transaction protocol.

10. The method of claim 9, wherein the first process is a coordinator of the two phase transaction protocol.

11. The method of claim 10, wherein the second process is a coordinator of the two phase transaction protocol.

12. The method of claim 11, wherein the plurality of processes are coordinators of the two phase transaction protocol.

13. The method of claim 9, wherein the first process is a participant in the two phase transaction protocol.

14. The method of claim 13, wherein the second process is a participant in the two phase transaction protocol.

15. The method of claim 14, wherein the plurality of processes are participants in the two phase transaction protocol.

16. A system for performing transaction execution comprising:
   a processor operable to execute computer program instructions;
   a memory operable to store computer program instructions executable by the processor; and
   computer program instructions stored in the memory and executable to perform the steps of:
   beginning execution of a transaction using a first process;
   not maintaining a log of the transaction;
   storing a state of execution of the transaction only in user state information included in cluster information accessible to a plurality of processes including the first process;
   switching a context from the first process to a second process that is one of the plurality of processes having access to the user state information included in the cluster information; and
   continuing execution of the transaction using the second process and the user state information included in the cluster information.

17. The system of claim 16, wherein the step of switching the context from the first process to the second process is performed if the first process fails.

18. The system of claim 17, wherein the first process is a server process.

19. The system of claim 18, wherein the second process is a server process.

20. The system of claim 19, wherein the plurality of processes are server processes.

21. The system of claim 17, wherein the first process is an application server process.

22. The system of claim 21, wherein the second process is an application server process.

23. The system of claim 22, wherein the plurality of processes are application server processes.

24. The system of claim 17, wherein the transaction is executed using a two phase transaction protocol.

25. The system of claim 24, wherein the first process is a coordinator of the two phase transaction protocol.

26. The system of claim 25, wherein the second process is a coordinator of the two phase transaction protocol.

27. The system of claim 26, wherein the plurality of processes are coordinators of the two phase transaction protocol.

28. The system of claim 24, wherein the first process is a participant in the two phase transaction protocol.

29. The system of claim 28, wherein the second process is a participant in the two phase transaction protocol.

30. The system of claim 29, wherein the plurality of processes are participants in the two phase transaction protocol.

31. A computer program product for performing transaction execution comprising:
   a computer readable recordable-type medium;
   computer program instructions, recorded on the computer readable recordable-type medium, executable by a processor, for performing the steps of
   beginning execution of a transaction using a first process;
   not maintaining a log of the transaction;
   storing a state of execution of the transaction only in user state information included in cluster information accessible to a plurality of processes including the first process;
   switching a context from the first process to a second process that is one of the plurality of processes having access to the user state information included in the cluster information; and
   continuing execution of the transaction using the second process and the user state information included in the cluster information.

32. The computer program product of claim 31, wherein the step of switching the context from the first process to the second process is performed if the first process fails.

33. The computer program product of claim 32, wherein the first process is a server process.

34. The computer program product of claim 33, wherein the second process is a server process.

35. The computer program product of claim 34, wherein the plurality of processes are server processes.

36. The computer program product of claim 32, wherein the first process is an application server process.

37. The computer program product of claim 36, wherein the second process is an application server process.

38. The computer program product of claim 37, wherein the plurality of processes are application server processes.

39. The computer program product of claim 32, wherein the transaction is executed using a two phase transaction protocol.

40. The computer program product of claim 39, wherein the first process is a coordinator of the two phase transaction protocol.

41. The computer program product of claim 40, wherein the second process is a coordinator of the two phase transaction protocol.

42. The computer program product of claim 41, wherein the plurality of processes are coordinators of the two phase transaction protocol.

43. The computer program product of claim 39, wherein the first process is a participant in the two phase transaction protocol.

44. The computer program product of claim 43, wherein the second process is a participant in the two phase transaction protocol.

45. The computer program product of claim 44, wherein the plurality of processes are participants in the two phase transaction protocol.

* * * * *